(12) United States Patent
Yang et al.

(10) Patent No.: US 8,588,296 B2
(45) Date of Patent: Nov. 19, 2013

(54) BITRATE CONTROL ALGORITHM FOR VIDEO TRANSCODING SYSTEMS

(75) Inventors: Kyeong H. Yang, Freehold, NJ (US); Ran Ding, Eatontown, NJ (US); Ramachandran Ramani, Parsippany, NJ (US)

(73) Assignee: Dialogic Corporation, Montreal, Quebec (CA)

( * ) Notice: Subject to any disclaimer, the term of this patent is extended or adjusted under 35 U.S.C. 154(b) by 689 days.

(21) Appl. No.: 12/497,110

(22) Filed: Jul. 2, 2009

(65) Prior Publication Data

US 2011/0002381 A1    Jan. 6, 2011

(51) Int. Cl.
*H04N 7/12*    (2006.01)

(52) U.S. Cl.
USPC .................................. 375/240.03

(58) Field of Classification Search
USPC ...................... 375/240.03–240.26
IPC ....................................... H04N 7/12
See application file for complete search history.

(56) References Cited

U.S. PATENT DOCUMENTS

| | | | |
|---|---|---|---|
| 6,587,508 B1 * | 7/2003 | Hanamura et al. | 375/240.24 |
| 6,687,296 B1 * | 2/2004 | Sato et al. | 375/240.12 |
| 7,263,126 B2 * | 8/2007 | Zhao et al. | 375/240.04 |
| 7,366,240 B2 * | 4/2008 | Chiang Wei Yin et al. | 375/240.26 |
| 7,403,562 B2 | 7/2008 | Yang et al. | |
| 2009/0086814 A1 * | 4/2009 | Leontaris et al. | 375/240.02 |

OTHER PUBLICATIONS

Optimum Bit Allocation and Accurate Rate Control for Video Coding Via p-Domain Source Modeling © 2002 IEEE, IEEE Transactions on Circuits and systems for video Technology, vol. 12, No. 10, Zhihai He and Sanjit K. Mitra.

* cited by examiner

*Primary Examiner* — Tung Vo (57) ABSTRACT

A video transcoding system and method employing an improved rate control algorithm. A plurality of frames in an input video bitstream are received by the system, in which each frame is in a first coding format. Each frame in the input bitstream is decoded, and complexity information indicating the complexity of the frame after decoding is obtained. An estimated number of bits to allocate for the respective frame is calculated. Using a rate estimation model that employs the complexity information for the respective frame, a picture cost for the frame is calculated based on the estimated number of bits allocated to encode the frame, and a parameter of the rate estimation model. A target cost for the respective frame is calculated based at least in part on the picture cost and the complexity information for the frame. A quantization parameter (QP) is calculated that, when used to encode the respective frame in a second coding format, would generate an encoded frame having an actual cost approximately equal to the target cost. The respective frame is encoded using the calculated QP, and the frames encoded in the second coding format are provided in an output video bitstream.

26 Claims, 6 Drawing Sheets

BITRATE CONTROL ALGORITHM FOR VIDEO TRANSCODING SYSTEMS

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present application relates generally to transcoding systems for transcoding a signal stream compressed according to a specified coding format into another signal stream compressed according to a different specified coding format, and more specifically to transcoding systems for transcoding digital video streams compressed according to coding formats such as H.263, H.264, and MPEG-4.

BACKGROUND OF THE INVENTION

One of the most significant developments to take place in communications technology has been the increasing availability of multimedia services that combine and coordinate video with voice and text applications. An important aspect in delivering multimedia services over communications networks is the translation or "transcoding" of media streams such as audio and/or video into formats supported not only by the networks that carry the media streams, but also the end-point devices that receive the media streams, such as traditional personal computers (PCs), mobile PCs, personal digital assistants (PDAs), video-enabled mobile phones, mobile televisions (TVs), third generation (3G) phone sets, or any other suitable multimedia systems or devices.

Rate control is a vital function in video transcoding systems due to its impact on video quality. A conventional video transcoding system typically includes a buffer that receives an input video stream compressed according to a first coding format, a video decoder that decodes the input stream in the first coding format, and a video encoder that encodes the decoded stream according to a second coding format, thereby producing an output video stream in the second coding format. Although video encoders typically encode video as a variable bitrate stream, many multimedia applications and networks require a constant bitrate stream to assure good quality video. For this reason, rate control algorithms have traditionally been implemented within such video transcoding systems to control the bitrate of the video encoder output, thereby adapting the video transcoding system to the network environment in which it is employed.

Various types of rate control algorithms have been developed for controlling the output bitrate of video encoders. For example, model based adaptive rate control algorithms that can adapt to the dynamic characteristics of video streams have been employed in standalone video encoders to produce encoded video sequences of good quality. However, using such conventional model based adaptive rate control algorithms in video transcoding systems can sometimes have a detrimental effect on video quality because the characteristics of the decoded video stream received as input by the video encoder within the video transcoding system are generally different from the characteristics of the input video frames received by the standalone video encoder. Such differences in the characteristics of the decoded video stream generated within the video transcoding system may cause conventional rate control algorithms to make inefficient allocations of bits across the video stream. For example, in the video transcoding system, too many bits might be allocated to some video frames, leaving too few bits for encoding the remaining video frames, thereby causing "blocky" or "blurry" video in those frames that were allocated an insufficient number of bits. Moreover, those frames that were encoded using too many bits may require an inordinate amount of time to be transmitted through a constant bitrate network, resulting in, for example, poor lip synchronization of the video and audio signals at the endpoint device.

It would therefore be desirable to have an improved rate control algorithm for use in a video transcoding system that avoids one or more of the drawbacks of conventional rate control algorithms.

BRIEF SUMMARY OF THE INVENTION

In accordance with the present application, a video transcoding system and method is provided that employs an improved rate control algorithm. In the presently disclosed embodiment, the improved rate control algorithm is a model based adaptive bitrate control algorithm incorporating a rate estimation model that uses information derived from a decoded input video bitstream for better characterizing the input bitstream when performing the rate control function. The rate estimation model incorporated within the model based adaptive bitrate control algorithm also adapts to the local characteristics of a video sequence provided as input to the video transcoding system.

In one embodiment, the video transcoding system employing the model based adaptive bitrate control algorithm includes a depacketizer, a video decoder buffer, a video decoder, an intermediate video data generator, a video encoder, and a video encoder buffer. The depacketizer receives a video packet sequence as input, converts the video packet sequence into a plurality of video frames compressed according to a first coding format, and provides the plurality of video frames to the video decoder buffer. The video decoder reads a series of video frames in the first coding format from the decoder buffer, decodes the video frames, and provides the decoded video frames to the intermediate video data generator. For example, the intermediate video data generator may be a YUV data generator or any other suitable type of data generator. The intermediate video data generator generates intermediate video data such as YUV data from the decoded video frames, extracts information from the decoded video frames (such as the number of bits in the respective frames, the average quantization parameter for the respective frames, and the decoder type), and provides the intermediate video data and the extracted information to the video encoder. The video encoder includes at least one processor operative to execute at least one program out of at least one memory to analyze the respective frames, to perform the rate control function, and to encode the video frames in accordance with a second coding format.

In an exemplary embodiment, the processor within the video encoder performs motion estimation on the intermediate video data including calculating the motion compensated sum of absolute differences for each frame in the series of video frames, detects scene changes using the calculated motion compensated sum of absolute differences, and determines an appropriate size of a group of pictures (GOP) within the series of video frames based at least in part on the detected scene changes. Next, the video encoder processor processes the intermediate video data using a discrete cosine transform (DCT) to produce a plurality of DCT coefficients, including a number of non-zero DCT coefficients. Both the information extracted from the decoded video frames and the number of non-zero DCT coefficients provide indications of the spatiotemporal complexity of the respective pictures. When performing the rate control function, the video encoder processor employs the information extracted from the decoded frames, the calculated motion compensated sum of absolute differences for the frames, and the non-zero DCT coefficients in the rate estimation model to obtain an estimate of the number of bits to allocate for encoding each picture in a current GOP, and to calculate the quantization parameters to be used for encoding the respective pictures. The video encoder processor then implements the rate control function by executing the model based adaptive bitrate control algorithm.

In one mode of operation, the processor within the video encoder executes the model based adaptive bitrate control algorithm to calculate the number of bits to allocate for each picture in the current GOP based at least in part on the number of bits available to encode all of the pictures in the current GOP, and the number of pictures that have not yet been encoded in the current GOP. Next, a cost, referred to herein as the "picture cost", is calculated for the respective picture using the calculated number of bits and a model parameter for the rate estimation model. A target number of non-zero DCT coefficients is then calculated using the picture cost, the calculated motion compensated sum of absolute differences for the frame, and the information extracted from the decoded frame, namely, the number of bits in the respective frames, the average quantization parameter for the respective frames, and the decoder type. Next, a first estimate of the quantization parameter (QP) to use for encoding the frame according to the second coding format is determined, the DCT coefficients are quantized using the first estimated QP, and the resulting number of non-zero DCT coefficients are counted. A second estimate of the quantization parameter is then determined based on whether or not the number of non-zero DCT coefficients exceeds the target number of non-zero DCT coefficients. Further, the DCT coefficients are quantized again using the second estimated QP, and the number of non-zero DCT coefficients resulting from the quantization using the second estimated QP are counted. Next, a curve fitting technique is performed to obtain an expression for the non-zero DCT coefficients as a function of QP. The function obtained using the curve fitting technique is then employed to calculate a final QP, which is subsequently used to generate a number of non-zero DCT coefficients for the picture that is approximately equal to the target number of non-zero DCT coefficients. Next, the respective picture is encoded according to the second coding format using the final QP, the model parameter is updated based on the actual number of bits used for encoding the respective picture and the picture cost, and the encoded picture is provided to the video encoder buffer. The encoded pictures in the current GOP can then be read from the video encoder buffer as part of an output video bitstream.

According to one aspect of the model based adaptive bitrate control algorithm, a decision can be made to skip at least the current frame if it is determined that there are not enough bits available to encode the respective frame in accordance with an acceptable quality level. This aspect of the bitrate control algorithm allows the video encoder to achieve a specified bitrate while avoiding overflow of the video encoder buffer.

According to another aspect of the model based adaptive bitrate control algorithm, a specified bitrate constraint can be satisfied by requiring the video encoder buffer to avoid an overflow condition, and further requiring the number of bits allocated for encoding each picture in a group of pictures to be less than a specified maximum number of bits. By meeting the constraint of the specified maximum number of bits, synchronization between video and audio data at the endpoint device is assured.

By providing a video transcoding system that employs a model based adaptive bitrate control algorithm that uses information derived from a decoded input video bitstream for better characterizing the input bitstream when performing the rate control function, increased accuracy in bitrate control can be achieved. As a result, the video transcoding system can produce a high quality video output that substantially eliminates "blocky" or "blurry" video from the output video bit stream, while maintaining synchronization between the audio and video data at the endpoint device.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIG. 3b is a flow diagram of an exemplary method of making a frame skip pattern decision within the exemplary method of FIG. 3a;

FIG. 3c is a flow diagram of an exemplary method of detecting a scene change within the exemplary method of FIG. 3a.

DETAILED DESCRIPTION OF THE INVENTION

A video transcoding system and method is disclosed that employs an improved rate control algorithm. The presently disclosed video transcoding system employs a model based adaptive bitrate control algorithm that uses information derived from an input video bitstream provided to the video transcoding system for better characterizing the video sequence provided to the video encoder when performing the rate control function. Such improved characterization of the input video bitstream allows the video transcoding system to control the output bitrate with increased accuracy, thereby allowing a high quality video output to be produced in which "blocky" or "blurry" video is substantially eliminated from the output video bit stream, and synchronization of audio and video data is well maintained at the endpoint device.

Figure 1:
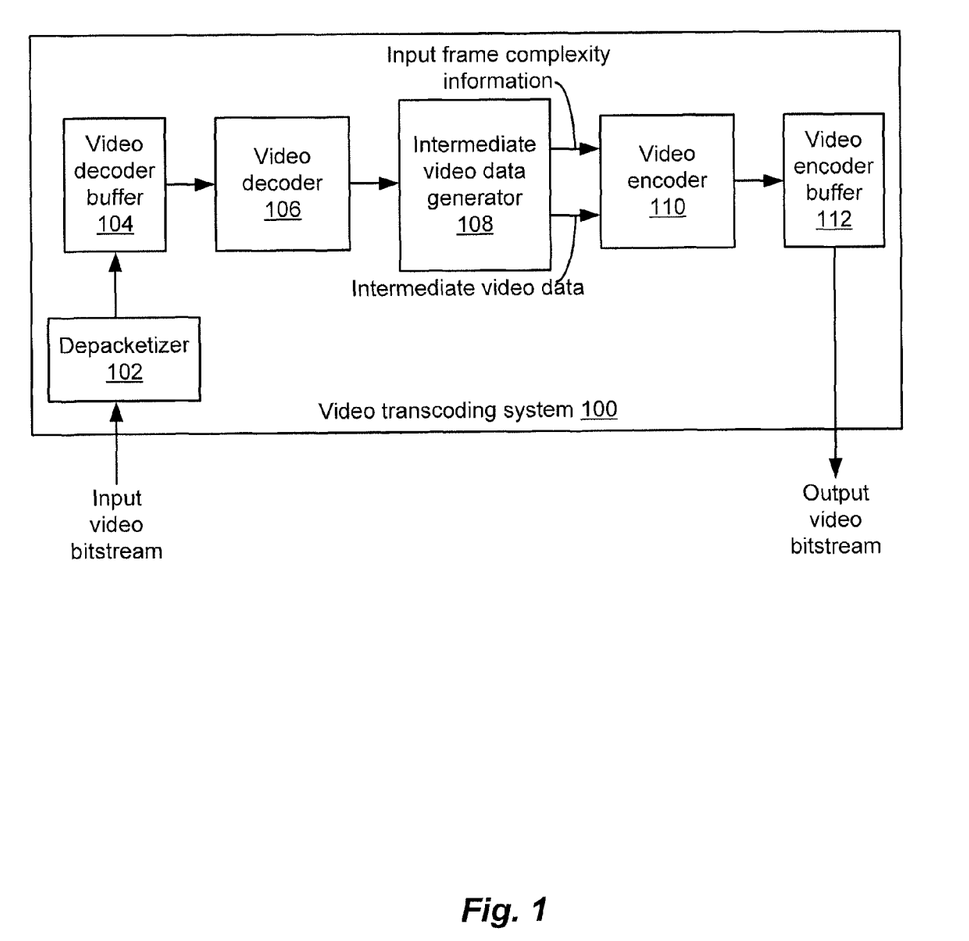
FIG. 1 is a block diagram of an exemplary video transcoding system according to the present application.

FIG. 1 depicts an illustrative embodiment of a video transcoding system 100, in accordance with the present application. In the illustrated embodiment, the video transcoding system 100 includes a depacketizer 102, a video decoder buffer 104, a video decoder 106, an intermediate video data generator 108, a video encoder 110, and a video encoder buffer 112. The depacketizer 102 is operative to receive an input video bitstream including a video packet sequence, to convert the video packet sequence into a plurality of video frame bitstreams compressed according to a first coding format, and to provide the plurality of video frame bitstreams to the video decoder buffer 104 for temporary storage. The video decoder 106 is operative to read a series of video frame bitstreams in the first coding format from the decoder buffer 104, to decode the video frame bitstreams, and to provide the decoded video frame bitstreams to the intermediate video data generator 108. For example, the intermediate video data generator 108 may be a YUV data generator or any other suitable type of video data generator. The intermediate video data generator 108 is operative to generate intermediate video data such as YUV data from the series of decoded video frame bitstreams, to extract information from the decoded frame bitstreams such as the number of bits in the respective frames, the average quantization parameter for the respective frames, and the decoder type, and to provide the intermediate video data and the information extracted from the decoded frame bitstreams to the video encoder 110. The video encoder 110 includes at least one processor operative to execute at least one program out of at least one memory to perform a frame analysis function on the intermediate video data, to perform the rate control function, and to encode the video frame bitstreams according to a second coding format.

Figure 2:
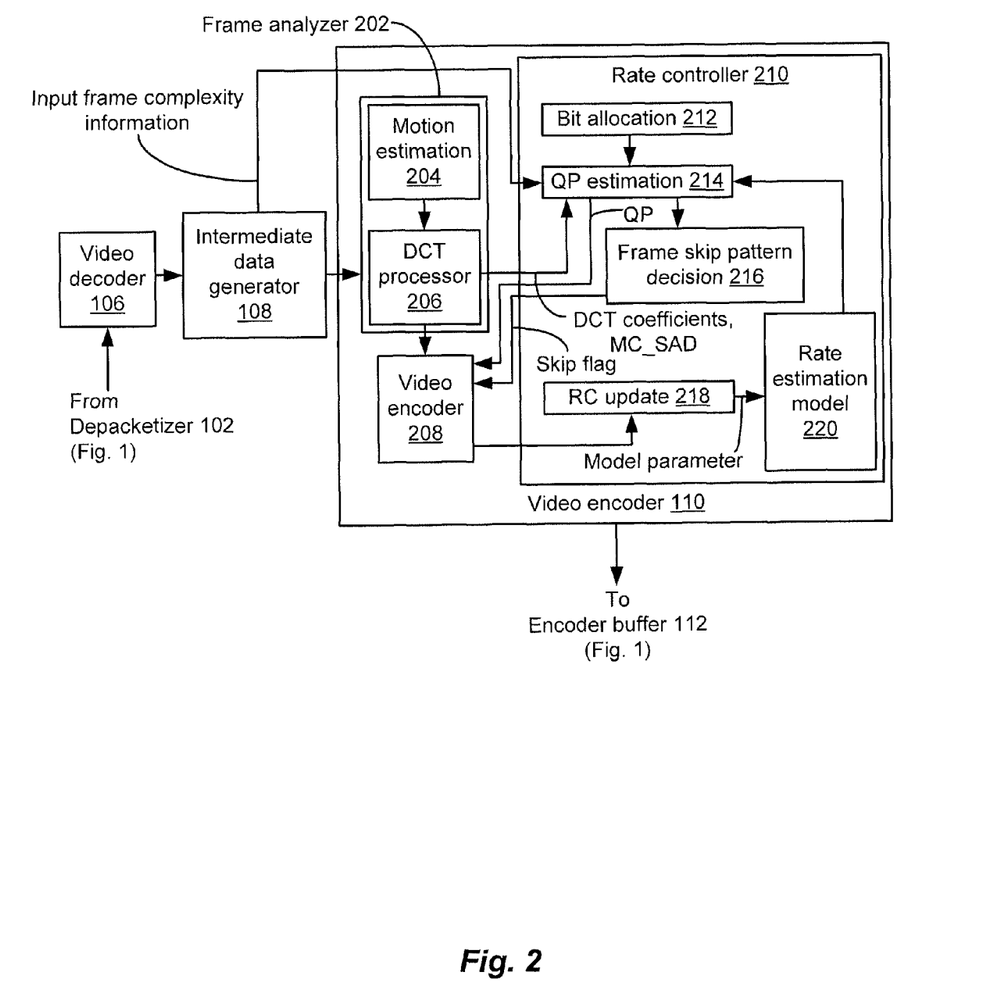
FIG. 2 is a detailed block diagram of an exemplary video encoder included in the exemplary video transcoding system of FIG. 1.

FIG. 2 depicts an illustrative embodiment of the video encoder 110 included in the video transcoding system 100 of FIG. 1. As shown in FIG. 2, the video encoder 110 includes a frame analyzer 202, a video encoder 208, and a rate controller 210 operative to perform the rate control function. In the illustrated embodiment, the rate control function includes a bit allocation function 212, a quantization parameter (QP) estimation function 214, a "frame skip pattern decision" function 216, a rate control (RC) update function 218, and a rate estimation model function 220. Moreover, the frame analyzer 202 includes a motion estimation processor 204 and a discrete cosine transform (DCT) processor 206. The motion estimation processor 204 is operative to perform motion estimation on the intermediate video data, including calculating a motion compensated sum of absolute differences (MC_SADs) for each frame in the series of video frames, and to detect scene changes using the calculated MC_SAD values. In one embodiment, the video encoder 110 is operative to determine the size of a group of pictures (GOP) within the series of video frames based at least in part on the detected scene changes. The DCT processor 206 is operative to process the intermediate video data using the discrete cosine transform to produce a plurality of DCT coefficients, including a number of non-zero DCT coefficients. Both the information extracted from the decoded video frames and the number of non-zero DCT coefficients provide indications of the spatiotemporal complexity of the respective pictures. When performing the rate control function, the rate controller 210 employs, within the rate estimation model, the information extracted from the decoded video frames, the calculated MC_SAD values, and the non-zero quantized DCT coefficients to obtain an estimate of the number of bits to allocate for encoding each picture in a current GOP, and to calculate the quantization parameters to be used for encoding the respective pictures. The rate controller 210 then implements the rate control function by executing the model based adaptive bitrate control algorithm.

In an illustrative mode of operation, the rate controller 210 is operative to execute the model based adaptive bitrate control algorithm as follows. First, the bit allocation function 212 is performed to calculate the estimated number of bits to allocate for each picture in the current group of pictures based at least in part on the number of bits available to encode all of the pictures in the current GOP, and the number of pictures that have not yet been encoded in the current GOP. The QP estimation function 214 is then performed to calculate a cost, referred to herein as the "picture cost", for the respective picture using the estimated number of bits and a model parameter used in the rate estimation model. Next, the QP estimation function 214 calculates a target number of non-zero quantized DCT coefficients for the respective picture using the picture cost, the MC_SAD values for the corresponding frame, and the information extracted from the decoded frames, namely, the number of bits in the respective frames, the average quantization parameter for the respective frames, and the decoder type. The QP estimation function 214 then determines a first estimate of the quantization parameter ($QP_{first}$) for encoding the corresponding frame, quantizes the DCT coefficients using the first quantization parameter $QP_{first}$, and counts the number of non-zero quantized DCT coefficients. Next, the QP estimation function 214 determines at least one second estimate of the quantization parameter ($QP_{second}$) based on whether or not the non-zero quantized DCT coefficient count exceeds the target non-zero DCT coefficient count. Further, the QP estimation function 214 quantizes the DCT coefficients using the second quantization parameter $QP_{second}$, and counts the number of non-zero quantized DCT coefficients resulting from the quantization with the second quantization parameter $QP_{second}$. The QP estimation function 214 is then performed to implement a curve fitting technique to obtain an expression for the number of non-zero quantized DCT coefficients as a function of QP. Next, the QP estimation function 214 employs this function to calculate a final QP, which is subsequently used to generate a number of non-zero quantized DCT coefficients for the picture that is approximately equal to the target number of non-zero DCT coefficients. In addition, the frame skip pattern decision function 216 is performed to decide whether or not to skip at least the current frame if it is determined that there are not enough bits available to encode the respective frame in accordance with an acceptable quality level, thereby allowing the video encoder to achieve a specified bitrate while avoiding overflow of the video encoder buffer 112. The encoder 208 then encodes the corresponding frame according to the second coding format using the final QP. Next, the RC update function 218 is performed to update the model parameter used in the rate estimation model function 220 based at least in part on the actual number of bits used for encoding the respective frame and the picture cost $C_{bits}$. Further, the video encoder 110 provides the encoded frame to the video encoder buffer 112. The encoded frames corresponding to the pictures in the current GOP can then be read from the video encoder buffer 112 as part of an output video bitstream.

Figure 3A:
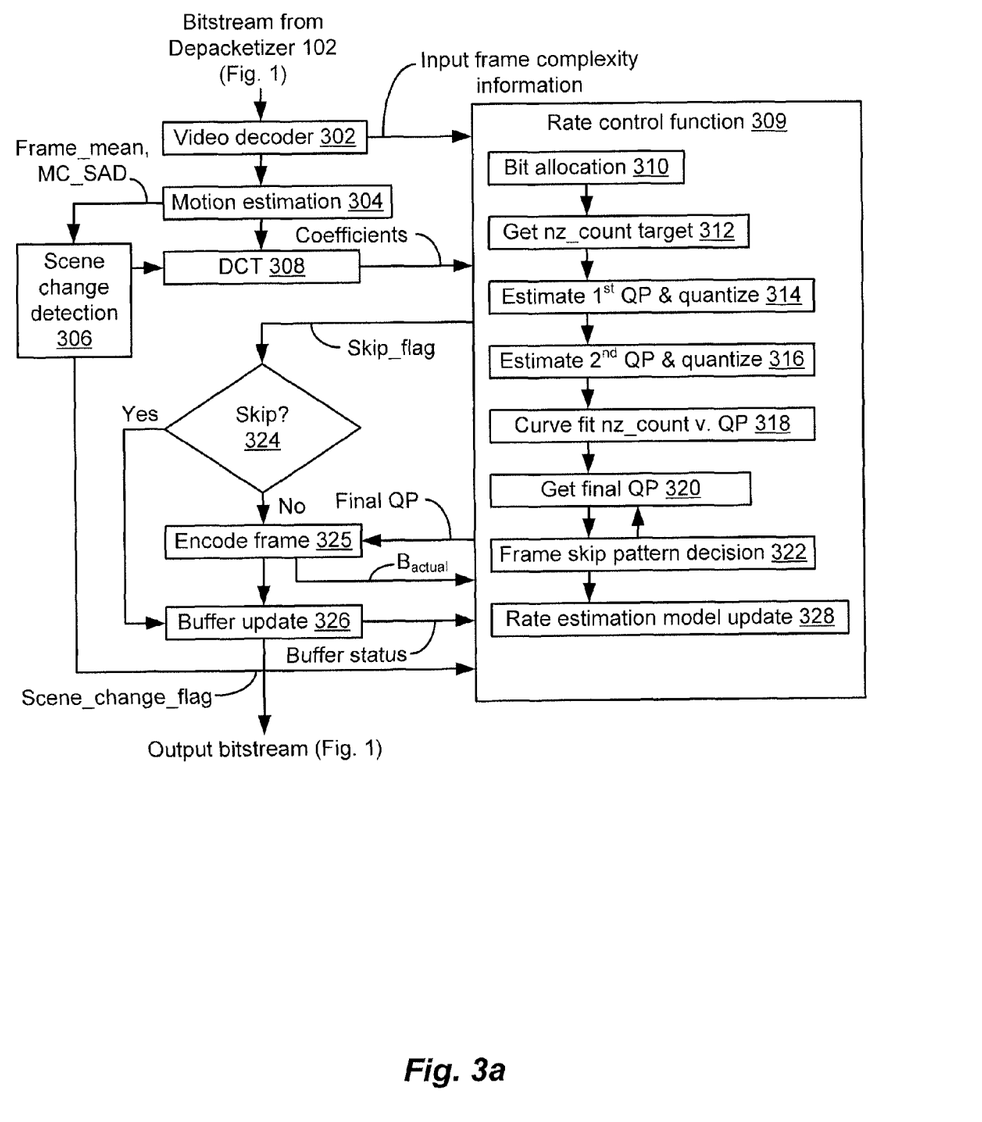
FIG. 3a is a flow diagram of an exemplary method of performing rate control within the exemplary video transcoding system of FIG. 1 according to the present application.
Figure 3B:
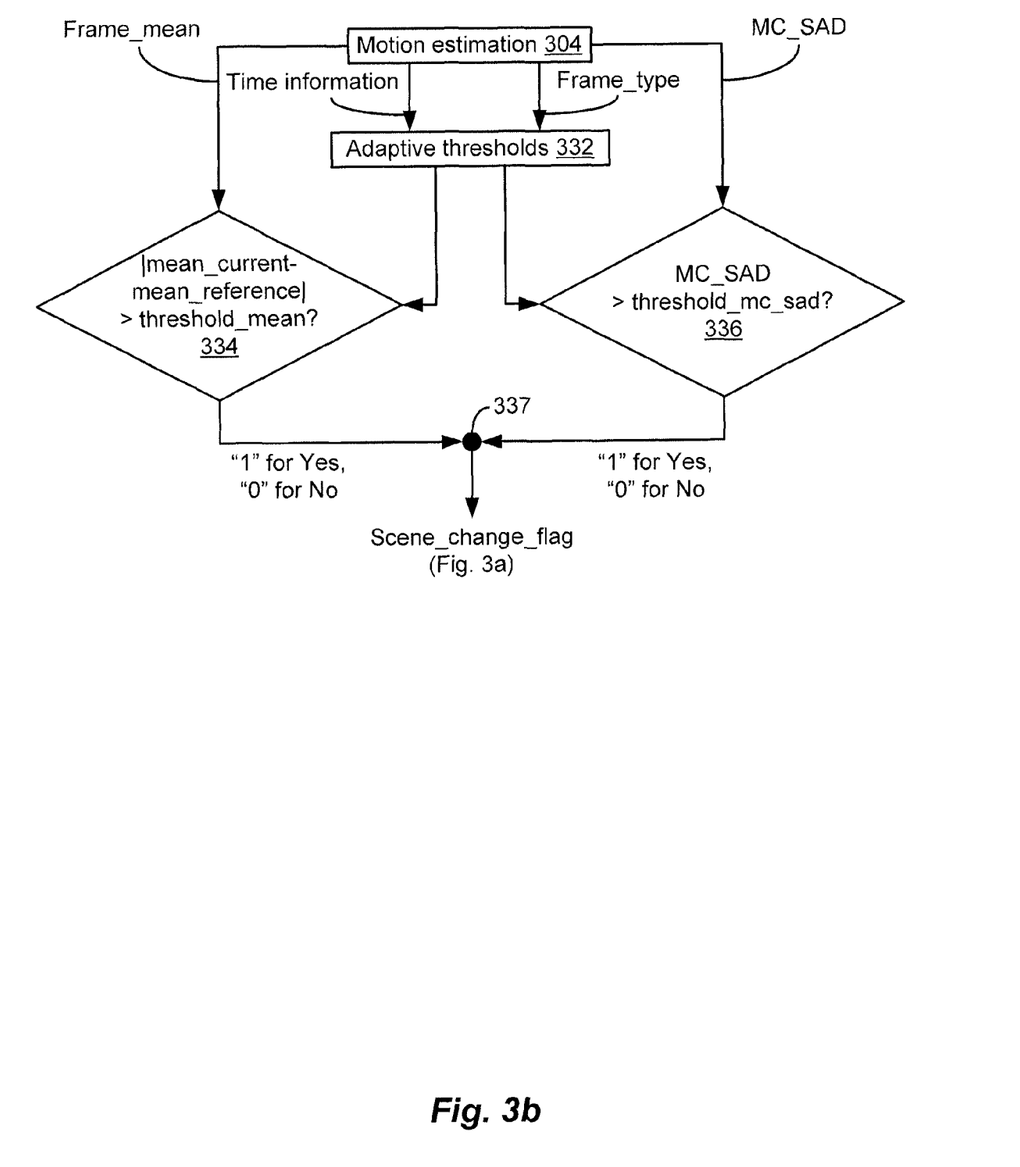
Figure 3C:
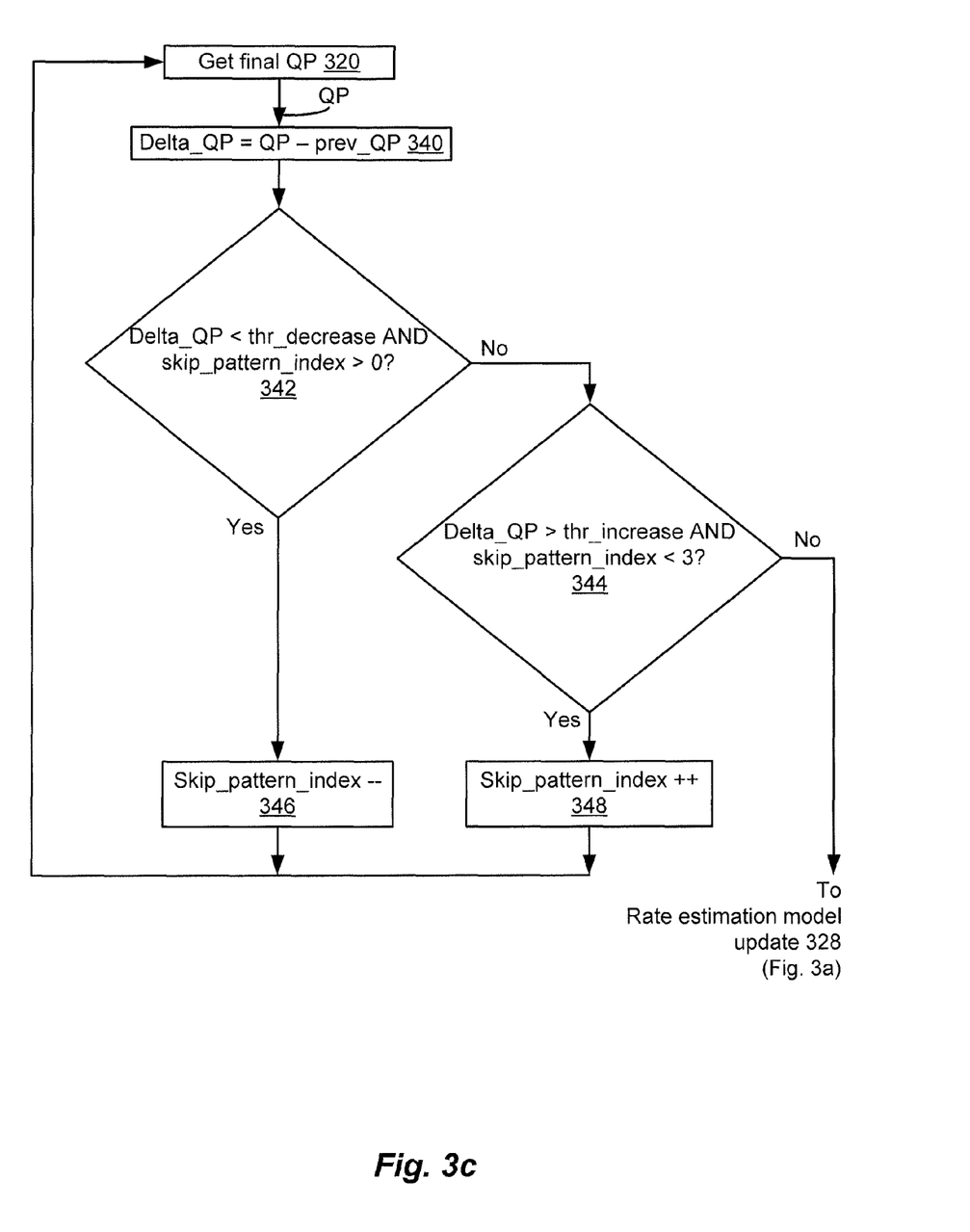

An illustrative method of performing rate control within the video transcoding system 100 is described below and with reference to FIGS. 3a, 3b, and 3c. It is noted that the illustrative method of FIGS. 3a, 3b, and 3c is particularly suited for use in transcoding a first video sequence compressed according to the H.263 coding format into a second video sequence compressed according to the MPEG-4 coding format, and vice versa. Further, the method of FIGS. 3a, 3b, and 3c is described with reference to an MPEG-4 video encoder with I, P, and B pictures in a GOP structure. It should be understood, however, that the method of FIGS. 3a, 3b, and 3c may be practiced using any other suitable video encoding standards.

As depicted in step 302 (see FIG. 3a), a series of video frames in the first video bitstream, compressed according to the H.263 coding format, are decoded. Information is also extracted from the decoded frames, including the number of bits in the respective frames (bits_frame), the average quantization parameter for the respective frames (QP_avg), and/or the decoder type (codec_type). Next, motion estimation is performed on the decoded video frames, including calculating a motion compensated sum of absolute differences (MC_SADs) for each frame, as depicted in step 304. Using the calculated MC_SAD values, scene changes are then detected in the decoded video frames, as depicted in step 306.

In one embodiment, a scene change is indicated within the video transcoding system 100 by setting a flag (scene_change_flag), as shown in FIG. 3b. Specifically, the motion estimation performed in step 304 generates, in addition to the MC_SAD values, mean values of pixel data for the respective frames (frame mean), an indication of the frame type (I, P, or B), and time information such as the time of the current video frame to be displayed, as further shown in FIG. 3b. Adaptive thresholds for the frame mean (threshold_mean) and the MC_SAD values (threshold_mc_sad) are then determined using the frame type and time information, as depicted in step 332. Next, a determination is made as to whether the difference between the mean value of pixel data for the current video frame and the mean value of pixel data for a predetermined reference frame exceeds the threshold_mean, as depicted in step 334. If the difference between the mean value of pixel data for the current video frame and the mean value of pixel data for the predetermined reference frame exceeds the threshold_mean, then the scene_change_flag is set to the logical value "1", which is provided to a logical AND operation node 337. Otherwise, the scene_change_flag is reset to the logical value "0". Moreover, another determination is made as to whether the calculated MC_SAD value for the current frame exceeds threshold_mc_sad, as depicted in step 336. If the calculated MC_SAD value for the current frame exceeds threshold_mc_sad, then the scene_change_flag is set to the logical value "1", which is provided to the logical AND operation node 337. Otherwise, the scene_change_flag is reset to the logical value "0". The two logical values generated in steps 334 and 336 are then operated on within the logical AND operation node 337, which outputs the "final" scene_change_flag as the logical AND of the two logical values. In one embodiment, the size of a group of pictures (GOP) within the series of video frames is determined based at least in part on the scene changes detected in step 306.

It is noted that the technique described above for detecting scene changes combines frame mean differences and MC_SAD values for more effectively detecting new scenes. Moreover, the threshold_mean and threshold_mc_sad are set adaptively depending on the distance from the predetermined reference frame to the current video frame. Specifically, each threshold is weighted by the distance from the reference frame to the current frame, which is measured using the time information for the respective frame. The threshold becomes larger with a larger time difference since the time difference between two frames is usually larger if the frames are farther away from each other in a video sequence. Each threshold is also weighted by the location of the current frame in the current GOP. It is noted that the threshold becomes larger when the distance from the current frame to the I frame in the current GOP is decreased to avoid small GOPs.

Next, the decoded video frame data is processed using the discrete cosine transform (DCT) to produce a plurality of DCT coefficients, including a number of non-zero DCT coefficients, as depicted in step 308. The DCT coefficients and the information extracted from the decoded video frames are then provided to the rate control function 309, which executes the model based adaptive bitrate control algorithm. Specifically, the estimated number of bits to allocate (bits_allocated or $B_{est}$) for encoding the current video frame is calculated, as depicted in step 310, using the following expression:

$$\text{bits\_allocated} = \frac{\text{remaining\_bits\_currGOP}}{\text{remaining\_frames\_currGOP} \times (1 - \text{skip\_frame\_ratio})}, \quad (1)$$

in which "remaining_bits_currGOP" represents the number of bits that are available to encode all of the frames in the current GOP, "remaining_frames_currGOP" represents the number of frames that are not yet encoded in the current GOP, and "skip_frame_ratio" represents a value calculated by the frame skip pattern decision function, which is performed to determine whether or not to skip at least the current frame if there are not enough bits available to encode the current frame in accordance with an acceptable quality level. It is noted that it may be necessary to skip one or more frames during the video encoding process to satisfy the requirements of a constant bitrate network. Such frames are referred to herein as "skipped_frames". Further, in the context of the frame skip pattern decision function, a "skip_pattern_index" and a "skip_frame_ratio" are defined. In one embodiment, four skip pattern indices are employed and defined as follows.

skip_pattern_index "0": Encode all of the video frames.
skip_pattern_index "1": Skip every $3^{rd}$ frame.
skip_pattern_index "2": Skip every other frame.
skip_pattern_index "3": Skip 2 out of 3 frames.

Moreover, the skip frame ratios for the four skip pattern indices defined above are 0, ⅓, ½, and ⅔, respectively. The frame skip pattern decision function is discussed in further detail below.

Next, the target number of non-zero DCT coefficients (nz_count_target) for the current video frame is calculated, as depicted in step 312, using the following expressions:

$$B_{est} = w \cdot C_{bits} \quad (2\text{-}1)$$

$$C_{bits} = \text{nz\_count\_target} + \alpha \cdot \text{MC\_SAD} + f(\text{bits\_frame}, \text{QP\_avg}, \text{codec\_type}) \quad (2\text{-}2)$$

$$\text{nz\_count\_target} = C_{bits} - \{\alpha \cdot \text{MC\_SAD} + f(\text{bits\_frame}, \text{QP\_avg}, \text{codec\_type})\}, \quad (2\text{-}3)$$

in which equation (2-1) is the rate estimation model, $$C_{bits} = \frac{B_{est}}{w},$$

"w" is a model parameter used in the rate estimation model, "α" is a constant, "MC_SAD" represents the motion compensated sum of absolute differences for the current frame, and "bits_frame", "QP_avg", and "codec_type" represent the information extracted from the decoded frame, namely, the number of bits in the respective frames (bits_frame), the average quantization parameter for the respective frames (QP_avg), and the decoder type (codec_type). More specifically, bits_frame and QP_avg represent, respectively, the number of bits and the average QP collected from the input bitstream to the video decoder 106 of type codec_type. The function "f(bits_frame, QP_avg, codec_type)", in effect, informs the video encoder 110 of the complexity of the current frame. In one embodiment, for an H.263 to MPEG4 video transcoding system, α is set to 0.2, and w is initialized to 6.0 ($w_{init}$).

A plurality of estimates are then calculated of the quantization parameter (QP) that, when used to encode the current video frame, would generate the number of bits allocated in step 310. Specifically, a first estimate of the quantization parameter ($QP_{first}$) for encoding the current frame is calculated, and the DCT coefficients are quantized using the first quantization parameter $QP_{first}$, as depicted in step 314. The first quantization parameter $QP_{first}$ is calculated using the following expressions:

$$QP_{first}=2\cdot\gamma\cdot C_{estim}/(\delta+(\delta^2+4\cdot\gamma\cdot\text{bits\_allocated})^{1/2} \quad (3\text{-}1)$$

$$C_{estim}=\alpha\cdot MC\_SAD+f(\text{bits\_frame}, QP\_\text{avg}, \text{codec\_type}), \quad (3\text{-}2)$$

in which "$C_{estim}$" is the estimated picture cost, and "γ" and "δ" are constants that can be determined empirically. In one embodiment, γ and δ are set to 0.001865 and 0.1332, respectively. The number of non-zero quantized DCT coefficients, nz_count($QP_{first}$), are then counted.

As depicted in step 316, a second estimate of the quantization parameter ($QP_{second}$) for encoding the current frame is then calculated, and the DCT coefficients are quantized using the second quantization parameter $QP_{second}$. The second quantization parameter, $QP_{second}$, is calculated using the following expressions:

$$QP_{second}=QP_{first}+4, \text{ if } nz\_\text{count}(QP_{first})> nz\_\text{count\_target} \quad (4\text{-}1)$$

$$QP_{second}=QP_{first}-4, \text{ otherwise} \quad (4\text{-}2)$$

The number of non-zero quantized DCT coefficients, nz_count($QP_{second}$), are then counted.

Next, a curve fitting technique is employed to obtain an expression for the number of non-zero quantized DCT coefficients as a function of QP, using nz_count($QP_{first}$) and nz_count($QP_{second}$), as depicted in step 318. For example, the curve fitting technique may be performed using the piecewise linear approximation method or any other suitable curve fitting technique. Using the function nz_count(QP) obtained in step 318, a "final" QP is then calculated, as depicted in step 320. When DCT coefficients are subsequently quantized using this final QP, the number of non-zero quantized DCT coefficients generated for the current frame is expected to be approximately equal to the target number of non-zero DCT coefficients, nz_count_target.

As depicted in step 322, the frame skip pattern decision function is then performed to decide whether or not to skip at least the current video frame in the event it is determined that there are not enough bits available to encode the respective frame to an acceptable quality level. The frame skip pattern decision function causes the skip_pattern_index to be adjusted up or down if the QP used to encode the current frame is significantly different from the QP used to encode the previous frame of the same type (prev_QP). Specifically, the difference (delta_QP) between the final QP calculated in step 320 and the prev_QP is calculated, as depicted in step 340 (see FIG. 3c). Next, determinations are made as to whether delta_QP is less than a first predetermined threshold (thr_decrease), and whether the current skip_pattern_index is greater than 0, as depicted in step 342. In one embodiment, thr_decrease is set to −3. If delta_QP is less than the first predetermined threshold (thr_decrease) and the current skip_pattern_index is greater than 0, then the skip_pattern_index is decremented, as depicted in step 346. Otherwise, further determinations are made as to whether delta_QP exceeds a second predetermined threshold (thr_increase), and whether the current skip_pattern_index is less than 3, as depicted in step 344. In one embodiment, thr_increase is set to 4. If delta_QP exceeds the second predetermined threshold (thr_increase) and the current skip_pattern_index is less than 3, then the skip_pattern_index is incremented, as depicted in step 348. Otherwise, the method continues to step 328. Next, a determination is made as to whether the current frame is to be skipped based on the current skip_pattern_index 0, 1, 2, or 3. If the current frame is to be skipped based on the current skip_pattern_index 0, 1, 2, or 3, then the "skip_flag" is set. It is noted that if the skip_pattern_index is adjusted (incremented or decremented), then the method loops back to step 320 to calculate a new final QP, since a change in the skip_pattern_index will result in a change in the number of bits allocated for encoding the current frame. Otherwise, if the skip_pattern_index remains unchanged, then the method proceeds from step 322 to step 328.

Next, a determination is made, as depicted in step 324, as to whether or not to skip the current video frame, based on the setting of the skip_flag. If the skip_flag indicates that the current frame is to be skipped, then the method proceeds to step 326. Otherwise, the current frame is encoded according to the MPEG-4 coding format using the final QP, as depicted in step 325, and an indication of the actual number of bits used for encoding the current frame ($B_{actual}$) is provided to the rate control function 309. The encoded frame is then provided to the video encoder buffer for temporary storage, as depicted in step 326, and the buffer status (buffer_status), which indicates how many bits are still stored in the video encoder buffer and waiting to be transmitted over the constant bitrate network, is provided to the rate control function 309.

As depicted in step 328, after the current video frame is encoded, the model parameter w used in the rate estimation model is updated using the following expression:

$$w=\beta\cdot w+(1-\beta)\cdot(B_{actual}/C_{bits}), \quad (5)$$

in which "$B_{actual}$" is the actual number of bits used for encoding the frame, "$C_{bits}$" is the actual picture cost calculated using equation (2-2) above and the actual non-zero quantized DCT coefficient count (nz_count), and "β" is a weighting factor. In one embodiment, β is set to 0.5 if the difference between the average picture cost of the previously encoded frames and the actual picture cost of the current frame is less than 30%; otherwise, β is set to 0.3. However, if the current frame is the first frame in a video sequence, then β is set to 0.1. The encoded frames in the current GOP can then be read from the video encoder buffer as part of an output video bitstream, as depicted in step 326.

It was described above that the frame skip pattern decision function is performed within the presently disclosed video transcoding system to decide whether or not to skip at least the current frame in the event there are insufficient bits available to encode the respective frame to an acceptable quality level, thereby allowing the system to achieve a specified bitrate while avoiding overflow of the video encoder buffer. In one embodiment, a specified bitrate constraint can be satisfied by requiring the video encoder buffer to avoid an overflow condition, and requiring the number of bits allocated for encoding each picture in a group of pictures to be less than a specified maximum number of bits.

Figure 4A:
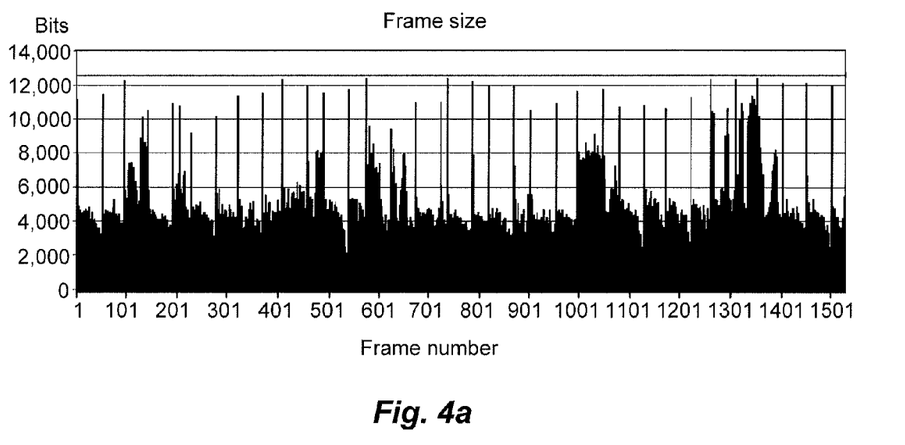
FIGS. 4a and 4b are diagrams depicting the number of bits generated by encoding the frames of a video sequence and the corresponding video encoder buffer status, respectively, for the exemplary video transcoding system of FIG. 1 configured to satisfy a specified bitrate constraint requirement.
Figure 4B:
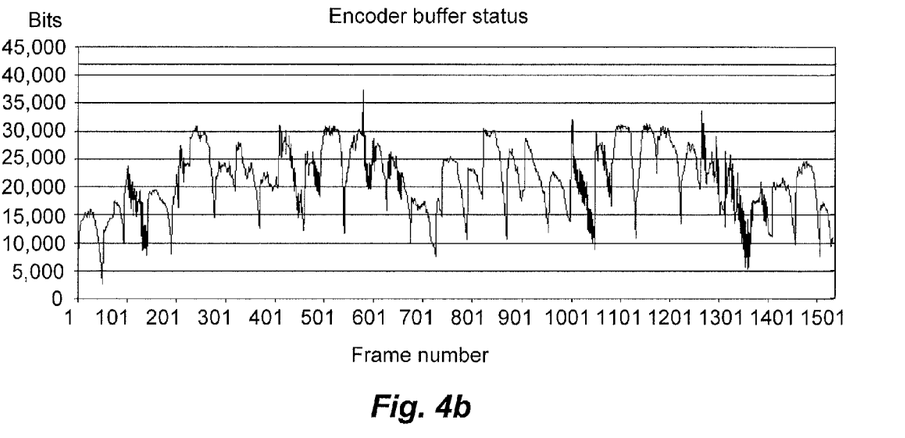

FIGS. 4a and 4b are diagrams depicting the number of bits in the frames (bits_frame) of a video sequence and the corresponding video encoder buffer status, respectively, for an exemplary video transcoding system implemented as an H.263 to MPEG-4 transcoder, in which the target bitrate is 42 Kbits/sec, the size of the video encoder buffer is 42 Kbits (1 second), and the specified maximum bits_frame is 12,600. As shown in FIGS. 4a and 4b, the rate control algorithm executed within this exemplary system meets the specified bitrate constraint without exceeding the maximum specified bits_frame (see FIG. 4a), and without causing the video encoder buffer to overflow (see FIG. 4b).

Having described the above illustrative embodiments of the presently disclosed video transcoding system and method, other alternative embodiments or variations may be made. For example, in an alternative embodiment, the rate estimation model employed by the model based adaptive bitrate control algorithm may be adapted to provide slice layer rate control or macroblock layer rate control.

It is noted that the operations performed by the above-described illustrative embodiments are purely exemplary and imply no particular order. Further, these operations can be used in any sequence when appropriate and/or can be partially used. With the above embodiments in mind, it should be understood that the above-described system and method can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared, or otherwise manipulated.

Moreover, any of the operations described herein that form part of the above-described system and method are useful machine operations. The presently disclosed system relates to a device or apparatus for performing these operations. The device or apparatus can be specially constructed for the required purpose, or can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The above-described system and method can be embodied at least in part as computer readable code on a computer readable medium. The computer readable medium is any data storage device that can store data, which can thereafter be read by a computer system. Examples of a computer readable medium include hard drives, read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion.

It will be appreciated by those of ordinary skill in the art that further modifications to and variations of the above-described bitrate control algorithm for video transcoding systems may be made without departing from the inventive concepts disclosed herein. Accordingly, the invention should not be viewed as limited except as by the scope and spirit of the appended claims.

What is claimed is:

1. A method of performing rate control in a video transcoding system, comprising the steps of:
    receiving, by the video transcoding system, an input video bitstream including a plurality of frames in an input video sequence, wherein each frame in the input video bitstream is in a first coding format;
    for each of at least some of the plurality of frames in the input video bitstream:
        decoding the respective frame using a predetermined type of video decoder;
        obtaining complexity information indicative of the complexity of the respective frame after decoding, the complexity information including a number of bits used by the respective frame, an average quantization parameter ($QP_{avg}$) used to encode the respective frame, and an indication of the predetermined type of video decoder used in the decoding of the respective frame;
        in a first calculating step, calculating an estimated number of bits to allocate for the respective frame;
        in a second calculating step, calculating, using a rate estimation model, a picture cost for the respective frame based on the estimated number of bits to allocate for the respective frame, and a model parameter for the rate estimation model;
        in a third calculating step, calculating a target number of non-zero discrete cosine transform (DCT) coefficients for the respective frame based at least in part on the picture cost for the respective frame, and the complexity information obtained for the respective frame after decoding;
        in a fourth calculating step, calculating a quantization parameter (QP) that, when used to quantize the plurality of DCT coefficients, a number of non-zero quantized coefficients approximately equal to the target number of non-zero DCT coefficients is generated; and
        encoding the respective frame using the calculated QP; and
    providing the respective frames encoded in the second coding format in an output video bitstream.

2. The method of claim 1 further comprising:
    for each of at least some of the respective frames encoded in the second coding format:
        determining an actual number of bits allocated for the respective frame;
        determining an actual cost for the respective frame; and
        updating the model parameter based at least in part on the actual number of bits used in encoding the respective frame and the actual cost for the respective frame.

3. The method of claim 2:
    further comprising, for each of at least some of the plurality of frames in the input video sequence, calculating a motion compensated sum of absolute difference (MC_SAD) value for the respective frame; and
    wherein, in the third calculating step, calculating the target number of non-zero DCT coefficients is based at least in part on the picture cost for the respective frame, the calculated MC_SAD for the respective frame, and the complexity information obtained for the respective frame after decoding.

4. The method of claim 2, wherein, in the fourth calculating step, the calculating of the QP includes:
    determining a first estimated QP for encoding the respective frame in the second coding format; and
    quantizing the plurality of DCT coefficients for the respective frame using the first estimated QP, the quantized plurality of DCT coefficients including a first number of non-zero quantized DCT coefficients.

5. The method of claim 4, wherein, in the fourth calculating step, the calculating of the QP further includes:
    determining a second estimated QP for encoding the respective frame in the second coding format, based on whether the first number of non-zero quantized DCT coefficients exceeds the target number of non-zero DCT coefficients; and quantizing the plurality of DCT coefficients for the respective frame using the second estimated QP, the quantized plurality of DCT coefficients including a second number of non-zero quantized DCT coefficients.

6. The method of claim 5, wherein, in the fourth calculating step, the calculating of the QP further includes:
obtaining an expression for the non-zero quantized DCT coefficients as a function of QP; and
determining a final QP for encoding the respective frame in the second coding format using the expression for the non-zero quantized DCT coefficients as the function of QP.

7. The method of claim 6, wherein the obtaining of the expression for the non-zero quantized DCT coefficients as the function of QP includes performing a curve fitting technique.

8. The method of claim 7, wherein the performing of the curve fitting technique includes performing a piecewise linear approximation technique.

9. The method of claim 6, wherein the encoding of the respective frame includes encoding the respective frame in the second coding format using the final QP.

10. The method of claim 3 further comprising detecting at least one scene change in the respective frames after decoding.

11. The method of claim 10:
wherein the calculating of the MC_SAD value for the respective frame includes generating a frame mean value of pixel data for the respective frame, an indication of a frame type, and time information including a time of the respective frame to be displayed; and
wherein the detecting of the at least one scene change includes determining, using the frame type and the time information, a first adaptive threshold for the frame mean and a second adaptive threshold for the MC_SAD values.

12. The method of claim 11, wherein the detecting of the at least one scene change further includes:
determining whether a difference between the frame mean value for the respective frame and the frame mean value for a specified reference frame exceeds the first adaptive threshold;
in the event the difference between the frame mean value for the respective frame and the frame mean value for the specified reference frame exceeds the first adaptive threshold, setting a first scene change flag; and
otherwise, resetting the first scene change flag.

13. The method of claim 12, wherein the detecting of the at least one scene change further includes:
determining whether the calculated MC_SAD value for the respective frame exceeds the second adaptive threshold;
in the event the calculated MC_SAD value for the respective frame exceeds the second adaptive threshold, setting a second scene change flag; and
otherwise, resetting the second scene change flag.

14. The method of claim 13, wherein the detecting of the at least one scene change further includes:
performing a logical AND operation on the first and second scene change flags to obtain a final scene change flag.

15. The method of claim 14 further comprising determining a size of a group of pictures (GOP) within the input video bitstream based at least in part on a value of the final scene change flag.

16. The method of claim 1 further comprising:
for each of at least some of the plurality of frames in the input video sequence:
determining whether enough bits are available to encode the respective frame in the second coding format in accordance with an acceptable quality level; and
in the event not enough bits are available to encode the respective frame in the second coding format in accordance with the acceptable quality level, skipping at least the respective frame.

17. A method of performing rate control in a video transcoding system, comprising the steps of:
receiving, by the video transcoding system, an input video bitstream including a plurality of frames in an input video sequence, wherein each frame in the input video bitstream is in a first coding format;
for each of at least some of the plurality of frames in the input video bitstream:
decoding the respective frame;
obtaining complexity information indicative of the complexity of the respective frame after decoding;
in a first calculating step, calculating an estimated number of bits to allocate for the respective frame;
in a second calculating step, calculating, using a rate estimation model, a picture cost for the respective frame based on the estimated number of bits to allocate for the respective frame, and a model parameter for the rate estimation model;
in a third calculating step, calculating a target cost for the respective frame based at least in part on the picture cost for the respective frame, and the complexity information obtained for the respective frame after decoding;
in a fourth calculating step, calculating a quantization parameter (QP) that, when used to encode the respective frame in a second coding format, would generate an encoded frame having an actual cost approximately equal to the target cost; and
encoding the respective frame using the calculated QP;
for each of at least some of the plurality of frames in the input video sequence:
determining whether enough bits are available to encode the respective frame in the second coding format in accordance with an acceptable quality level; and
in the event not enough bits are available to encode the respective frame in the second coding format in accordance with the acceptable quality level:
calculating a difference between the calculated QP and a QP used in encoding a previous frame; and
skipping the respective frame based at least in part on whether the difference between the calculated QP and the QP used in encoding the previous frame is less than a first predetermined threshold value, and whether a skip pattern index value is greater than a first predetermined index value; and
in the event at least one of the plurality of frames has not been skipped, providing, in an output video bitstream, the at least one of the plurality of frames encoded in the second coding format.

18. The method of claim 17, wherein the first predetermined index value is equal to 0, and wherein the skip pattern index value is equal to one of:
the first predetermined index value, indicating that all of the frames in the input video bitstream are to be encoded;
1, indicating that every $3^{rd}$ frame is to be skipped;
2, indicating that every other frame is to be skipped; and
3, indicating that 2 out of 3 frames are to be skipped.

19. The method of claim 17, wherein the first predetermined index value is equal to 0, and wherein the skipping of the respective frame further includes: in the event the difference between the calculated QP and the QP used in encoding the previous frame is less than the first predetermined threshold value, and the skip pattern index value is greater than the first predetermined index value, decrementing the skip pattern index value by 1.

20. The method of claim 19, wherein the skipping of the respective frame further includes:
   in the event the difference between the calculated QP and the QP used in encoding the previous frame is not less than the first predetermined threshold value, or the skip pattern index value is not greater than the first predetermined index value:
   determining whether the difference between the calculated QP and the QP used in encoding the previous frame exceeds a second predetermined threshold value; and
   determining whether the skip pattern index value is less than a second predetermined index value.

21. The method of claim 20, wherein the skipping of the respective frame further includes:
   in the event the difference between the calculated QP and the QP used in encoding the previous frame exceeds the second predetermined threshold value, and the skip pattern index value is less than the second predetermined index value, incrementing the skip pattern index value by 1.

22. The method of claim 21, wherein the skipping of the respective frame further includes:
   in the event the skip pattern index value indicates that at least the respective frame is to be skipped, skipping at least the respective frame.

23. The method of claim 21, wherein the skipping of the respective frame further includes:
   in the event the skip pattern index value has been decremented or incremented, performing the fourth calculating step to recalculate the QP.

24. A video transcoding system, comprising:
   a video decoder of a predetermined type operative to receive a video bitstream including a plurality of frames in a video sequence, each frame in the input video bitstream being in a first coding format, and, for each of at least some of the plurality of frames in the input video bitstream, to decode the respective frame;
   an intermediate video data generator operative, for each of at least some of the plurality of frames in the input video bitstream, to obtain complexity information indicative of the complexity of the respective frame after decoding, the complexity information including a number of bits used by the respective frame, an average quantization parameter ($QP_{avg}$) used to encode the respective frame, and an indication of the predetermined type of the video decoder used to decode the respective frame; and
   a video encoder including at least one processor operative to execute at least one program out of at least one memory:
      for each of at least some of the plurality of frames in the input video sequence:
         to calculate an estimated number of bits to allocate for the respective frame;
         using a rate estimation model, to calculate a picture cost for the respective frame based on the estimated number of bits to allocate for the respective frame, and a model parameter for the rate estimation model;
         to calculate a target number of non-zero DCT coefficients for the respective frame based at least in part on the picture cost for the respective frame, and the complexity information obtained for the respective frame after decoding;
         to calculate a quantization parameter (QP) that, when used to quantize the plurality of DCT coefficients, a number of non-zero quantized coefficients approximately equal to the target number of non-zero DCT coefficients is generated; and
         to encode the respective frame using the calculated QP; and
      to provide the respective frames encoded in the second coding format in an output video bitstream.

25. The system of claim 24, wherein the at least one processor contained in the video encoder is further operative to execute the at least one program out of the at least one memory:
   for each of at least some of the respective frames encoded in the second coding format:
      to determine an actual number of bits allocated for the respective frame;
      to determine an actual cost for the respective frame; and
      to update the model parameter based at least in part on the actual number of bits used in encoding the respective frame and the actual cost for the respective frame.

26. A method of performing rate control in a video transcoding system, comprising the steps of:
   receiving, by the video transcoding system, an input video bitstream including a plurality of frames in a video sequence; and
   for each of at least some of the plurality of frames in the input video bitstream:
      obtaining complexity information indicative of the complexity of the respective frame, the complexity information including a number of bits used by the respective frame, an average quantization parameter ($QP_{avg}$) used to encode the respective frame, and an indication of a predetermined type of video decoder used in decoding the respective frame;
      calculating an estimated number of bits to allocate for the respective frame;
      calculating a picture cost for the respective frame based at least in part on the estimated number of bits to allocate for the respective frame;
      calculating a target number of non-zero DCT coefficients for the respective frame based at least in part on the picture cost for the respective frame, and the complexity information obtained for the respective frame;
      calculating a quantization parameter (QP) that, when used to quantize the plurality of DCT coefficients, a number of non-zero quantized coefficients approximately equal to the target number of non-zero DCT coefficients is generated; and
      encoding the respective frame using the calculated QP.

* * * * *